Feb. 24, 1970       E. ANGERMUELLER       3,497,042
ELECTRIC WIRE MAST FOR ELECTRIC MOWERS
Filed Feb. 5, 1968                          3 Sheets-Sheet 1
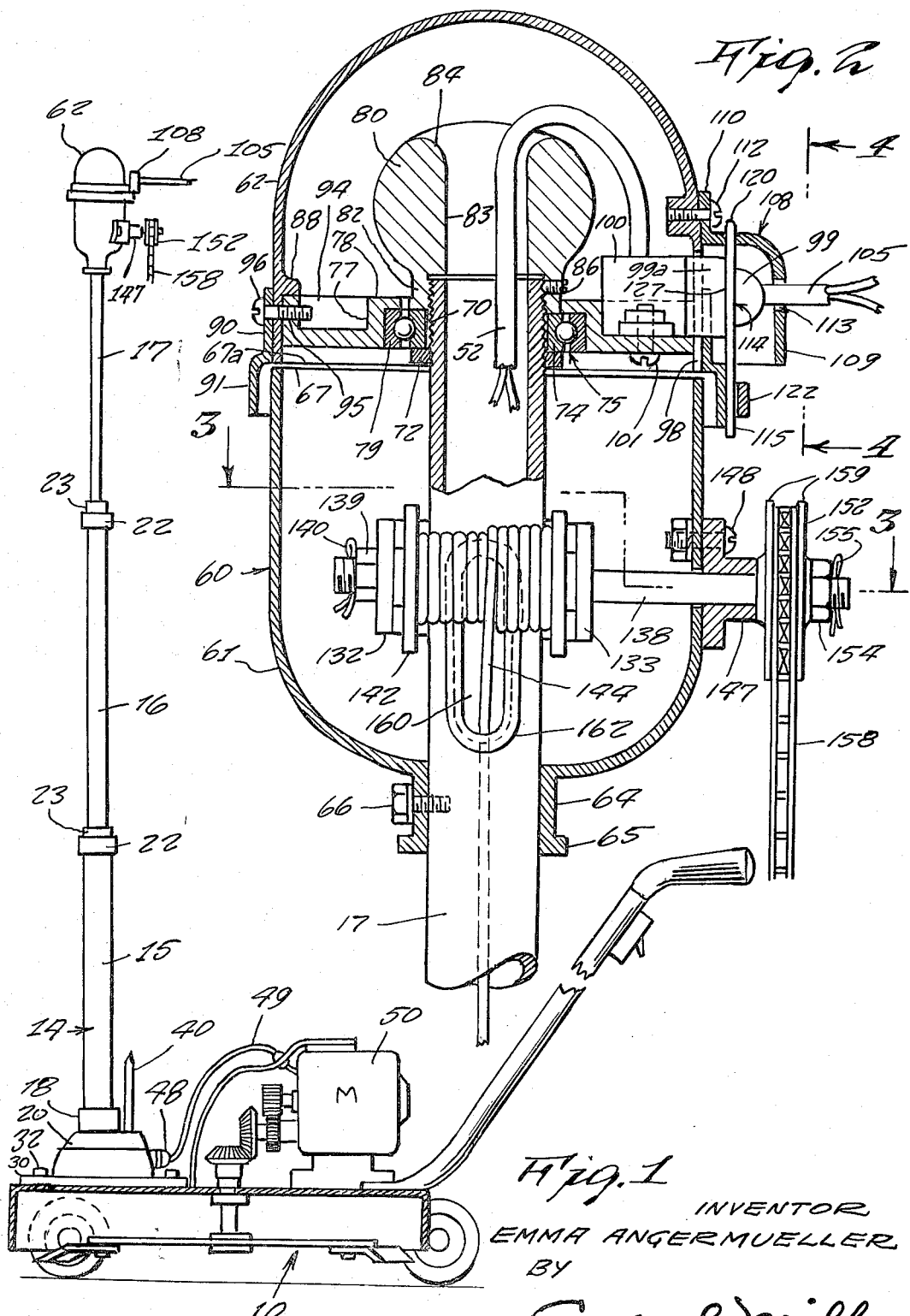
INVENTOR
EMMA ANGERMUELLER
BY
Carl Miller
ATTORNEY

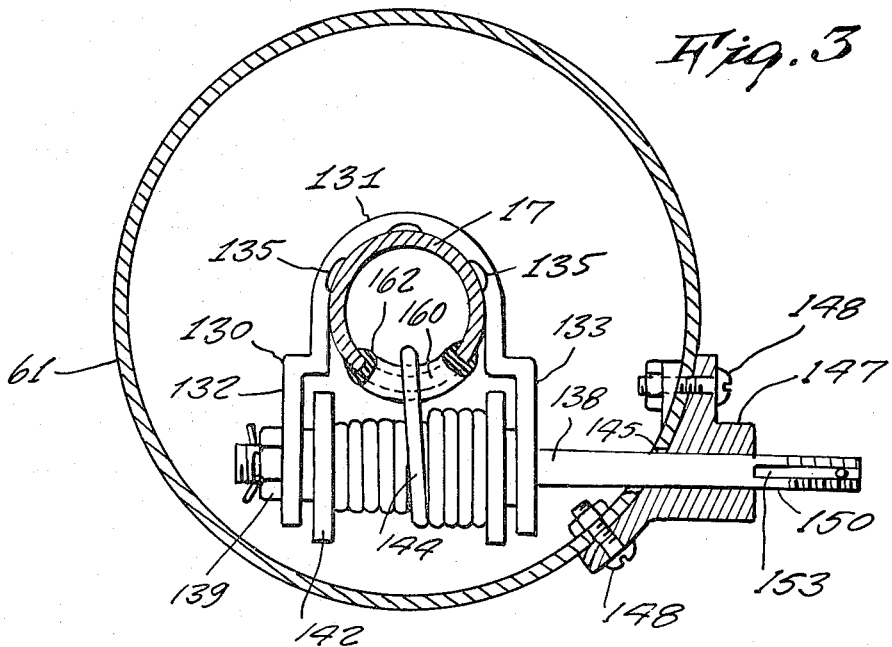
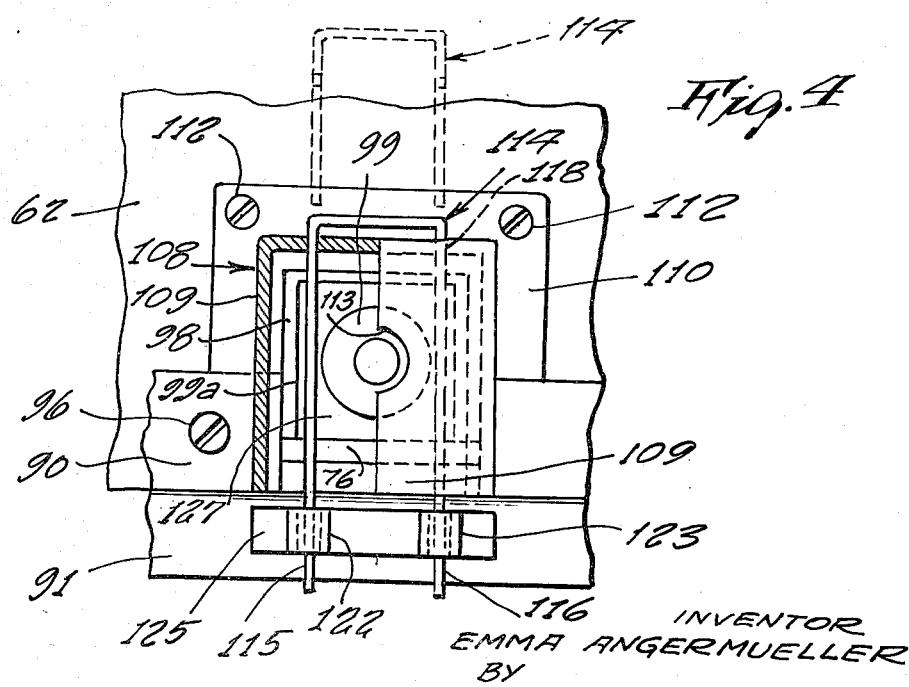

INVENTOR
EMMA ANGERMUELLER
BY
Carl Miller
ATTORNEY

United States Patent Office 3,497,042
Patented Feb. 24, 1970

3,497,042
ELECTRIC WIRE MAST FOR
ELECTRIC MOWERS
Emma Angermueller, 106 Commonwealth Drive,
Wyandanch, N.Y. 11798
Filed Feb. 5, 1968, Ser. No. 702,947
Int. Cl. H02g *11/00, 7/20;* F16m *11/00*
U.S. Cl. 191—12                                       10 Claims

ABSTRACT OF THE DISCLOSURE

A telescopic collapsible mast for electric lawn mowers to carry an electric conductor from a source of electric supply to the motor of the mower. The mast embodies three tubular telescoping sections, the lower of which is mounted on a hollow base including detachable means for attachment to the platform of the mower. The mast may also be detached from the mower and anchored in fixed position to the ground by means of a stake. At the top of the upper mast section is a two part housing. Bearing structure supports the upper housing part such as to permit a 360 degree rotation. The second conductor extending through all three sections is connected at its upper end to a socket carried by the rotating housing part to which socket the plug of the first conductor is detachably connected. Contained within the lower fixed housing part is a winch having a cable that is connected to the lower end of the intermediate section, the winch being operated by a sprocket chain to collapse the upper and intermediate sections.

---

This invention relates to a telescoping mast structure for use with electric lawn mowers and other electric machines such as edgers, hedge cutters and the like, the mast structure carrying the necessary conductor wires for connecting the electric lawn mower or other electric machine to a source of electric supply and has for its primary object controlling the disposition of the electric power supply conductor with regard to obstructions, obstacles and shrubbery and to avoid all entangling of the supply conductor with the operating person and machine during the operation thereof by improving the mobility of such machine over a lawn in all directions.

Another object of this invention is to provide a mast structure having three telescoping tubular sections including a hollow base to which the bottom end of the lower section is connected and a two part vertically disposed housing at the upper end of the upper section, the upper housing part having a ball bearing support providing a 360 degree movement and to which housing part the electric supply conductor is connected so that substantial ground coverage by the electric lawn mower can be effected by the fully extended position of the mast sections to achieve an advantageous height for the electric supply line.

A further object of this invention is to include within the telescoping connections a conductor wire having at its upper end a socket and plug connection carried by the rotating housing part to the electric supply conductor.

Yet another object of this invention is to provide a clip structure engageable with the plug connection to the socket of the electric supply conductor operative to prevent accidental disengagement of the plug from the socket.

A still further object of this invention is to provide within the fixed housing part a manually operated winch having a cable thereon that extends into and through the upper and intermediate mast sections and connected to the lower end of the intermediate section to effect by a winding up of the cable on the winch telescoping or collapse of the upper and intermediate sections.

Another object of this invention relates to providing for detachably mounting the hollow base of the mast on the platform of an electric lawn mower and to optionally remove the mast from the lawn mower for direct placement on the ground including a stake to be removably secured to the underside of the hollow base for penetration into the ground to anchor the mast in fixed position.

Yet another object of this invention relates to support means on the base of the mast for carrying the stake when the mast is mounted on the electric lawn mower so as to be available at all times.

These and other objects and advantages of the invention will be apparent from the following description, the accompanying drawings and the appended claims.

In the drawings:

FIGURE 1 is a side view showing the mast mounted on an electric lawn mower.

FIGURE 2 is a vertical section view of the mast head showing the two part housing and structure contained therein.

FIGURE 3 is a sectional view taken on line 3—3, FIGURE 2.

FIGURE 4 is a detail view partly in section taken on line 4—4, FIGURE 2.

Figure 6:
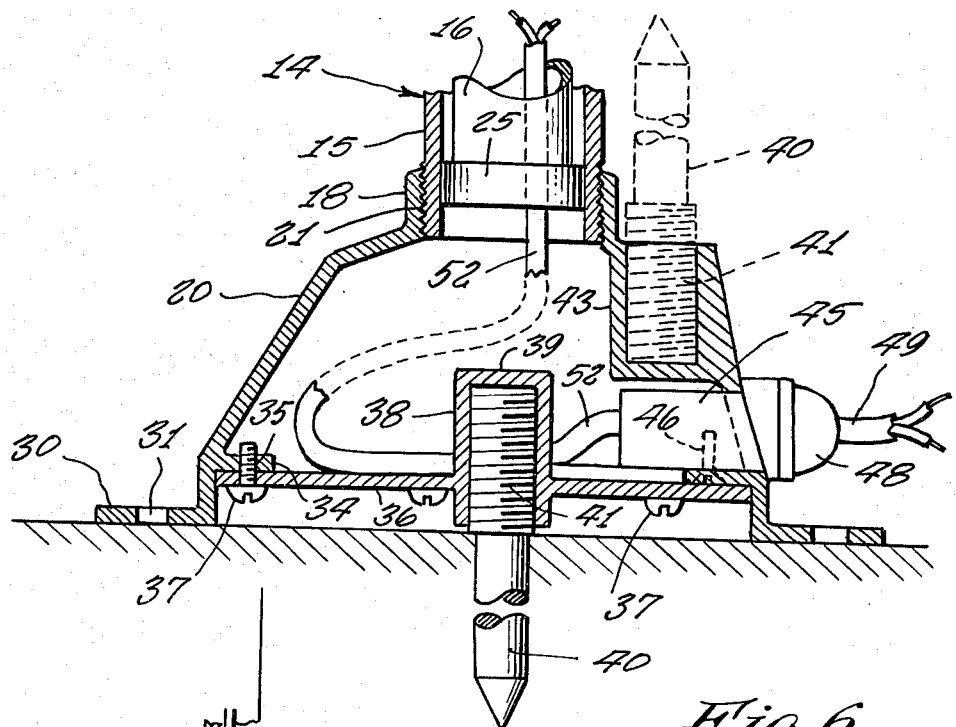
FIGURE 6 is a vertical sectional view of the hollow base of the mast with its stake connection for anchoring the mast to the ground.
Figure 5:
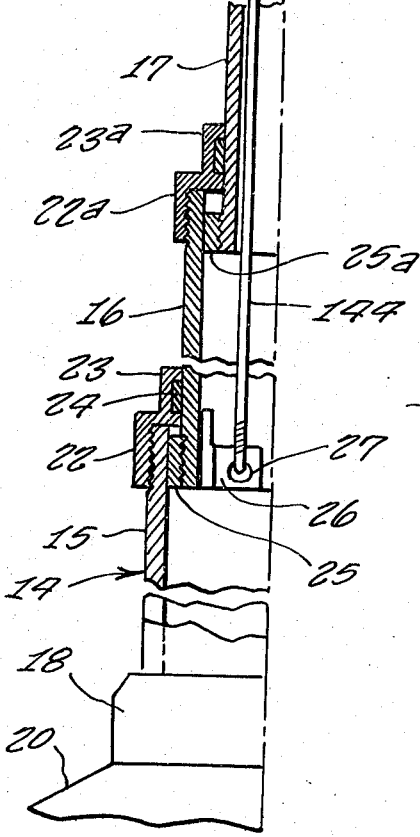
FIGURE 5 is a detail sectional view of the telescoping mast sections.

Referring to the drawings a conventional electric lawn mower 10 is shown in FIGURE 1 and is seen to have a platform 12 which supports a collapsible telescopic mast 14 at its forward end. The mast 14 is formed of three tubular sections 15, 16 and 17 dimensioned to telescope one within the other. The lower section 15 is vertically mounted at its lower end within a collar 18 of a hollow base 20 and is rigidly secured therein by a threaded connection 21, as shown in FIGURE 6. Threaded on the upper end of lower section 15 is a sleeve 22 which is in abutting engagement with the terminal end of the section 15, see FIGURE 5, and is provided with a reduced diameter guide collar 23 that surrounds the intermediate tubular section 16. If desired the guide collar 23 may be provided with a sealing and/or lubricating ring 24. The intermediate section 16 slidably extends through the guide collar 23 and has threadedly secured to its lower end a bearing and limit stop collar 25 that has sliding engagement with the inside cylindrical surface of the lower section 15. Outward telescopic movement of intermediate section 16 relative to lower section 15 is prevented by bearing collar 25 engaging guide collar 23 which as seen in FIGURE 5 extends radially inwardly beyond the inner wall of section 15. A like sleeve 22*a* having a guide collar 23*a* is threadedly mounted on the upper end of intermediate section 16 through which upper section 17 extends. Similarly secured to the lower inner end of section 17 is a bearing and limit stop collar 25*a*. Welded or otherwise secured to the inner wall of intermediate section 16 at its lower end is a lug 26 provided with an opening 27 for a purpose to be hereinafter described. The length of intermediate section 16 is such that in the fully telescoped (collapsed) position of section 17 therewithin, the lower terminal edge of section 17 and bearing collar 25*a* will be clear of lug 26.

The hollow base 20 is provided at its lower edge with a flange 30 having bolt receiving openings 31 for bolts 32 securing the base 20 to the mower platform 12. Provided interiorly of the base 20 and spaced slightly above the level of flange 30 is an annular flange 34 formed with a plurality of circumferentially spaced threaded openings 35. Seated against flange 34 of a closure plate 36 that is detachably secured thereto by screws 37 fitted into openings 35. An axial cylindrical sleeve 38 is formed integral with the closure plate 36 having its lower end open and its upper end preferably closed by an end wall 39. The sleeve 38 is internally threaded. Should it be desired to mount the mast 14 directly on the ground there is provided a stake 40 having its upper end threaded as at 41 and its lower end tapered, the stake 40 being secured at its upper end within closure plate sleeve 38 and its length forced into the ground, see FIGURE 6. The stake 40 operates to anchor the mast 14 to the ground and to prevent tilting thereof. It is thus apparent that the mast 14 may either be carried on the mower 10 by being secured to platform 12 by bolts 32 see FIGURE 1, or be detached therefrom and fixedly anchored to the ground by stake 40 as shown in FIGURE 6. As a convenience in having the stake 40 available at all times, the casing of hollow base 20 is provided with an integral re-entrant interiorly threaded cylindrical pocket 43 comparable to closure plate sleeve 38 for threadedly receiving the threaded end 41 of stake 40. Preferably the pocket 43 lies rearwardly of the mast 14 and the stake 40 when placed therein will thus be positioned behind the mast. Thus positioned, the stake 40 cannot become lost or misplaced and is immediately available for use when it is found desirable to remove the mast 14 and to anchor the same to the ground.

Beneath pocket 43 there is provided in the wall of the base 20 an opening for the reception of an electric socket 45 which is secured to the casing in any suitable manner as by screws 46. Co-acting with socket 45 is an electric plug 48 at one end of conductor 49 connected to the motor 50 of the mower 10. Connected to electric socket 45 is one end of a flexible wire conductor 52 which extends upwardly through sections 15, 16, 17 of mast 14.

The upper section 17 of mast 14 carries at its upper end a two-part housing 60, see FIGURES 1 and 2. The two-part housing 60 consists of a stationary part 61 and a 360° rotatable part 62. The stationary housing part 61 is of a bowl-shape, open at its top and provided at its bottom with a sleeve collar 64 having a lower radial flange 65. The sleeve collar 64 surrounds tubular section 17 and is rigidly secured thereto as by the screw 66, such that the upper end portion of section 17 extends axially upwardly through the stationary housing part 61 and a short distance beyond the plane of the open upper edge 67 thereof. This projecting end portion of the section 17 is externally threaded as at 70.

Located on upper section 17 at the base of threads 70 is a clamp collar 72. Seated on clamp collar 72 is the inner race 74 of a ball bearing 75. A circular support plate 76 is formed with an upstanding cylindrical boss 77 provided with a top radial flange 78 in which is positioned by a press-fit the outer race 79 of the ball bearing 75. Additional securing means (not shown) may be employed to lock the outer race 79 to the boss 77. A ball shaped cap 80 is provided with a depending sleeve extension 82, internally threaded, for threaded engagement with threads 70 of section 17, the extension 82 serving to securely clamp the inner race 74 to fixed clamp collar 72 so as to be non-rotatable on section 17. Ball cap 80 is provided with an axial bore 83, the upper edge surface portion 84 of the ball cap being rounded for a purpose to be hereinafter described. A set screw 86 on sleeve 82 serves to lock the ball cap 80 to section 17.

The rotating part 62 of the two-part housing 60 is of inverted bowl shape with its upper closed end of semi-spherical form and with its lower open end corresponding in diameter to the upper open end of stationary housing part 61. Provided interiorly of rotating housing part 61 are a plurality of circumferentially spaced lugs 88. Attached as by welding or other suitable means (not shown) to the lower exterior end of housing part 62 is the rim 90 of a depending circular shirt 91. The support plate 76 is provided with an upstanding peripheral flange 94 having a plurality of threaded openings 95 therein. Through the medium of lugs 88, the rotating housing part 62 seats on the support plate 76 in surrounding relation thereto and is secured to the support plate 76 by screws 96 engageable with threaded openings 95.

The wall of the housing part 62 is cut-out as at 98 to permit placement of an electric plug 99 into an electric socket 100 mounted on support plate 76 and secured in any desired manner thereto as by bolt 101. The other end of flexible electric conductor wire 52 is connected to socket 100, it being noted that conductor 52 extends through the bore 83 in the ball cap 80 and is looped over the rounded edge surface 84 thereof, as shown in FIGURE 2. The rounded edge 84 provides a wide curved surface providing freedom of movement of the conductor 52 thereover as rotating housing part 62 turns on section 17, as well as obviating stress, strain and/or fracture of the conductor 52. To reduce friction in the movement of the conductor 52 over rounded surface 84 there may be provided on the said surface a coating of Teflon or other anti-friction material. The plug 99 is connected to one end of a conductor wire 105 which is usually of a considerable length with its other end connected by a like plug to a socket in turn connected to a source of electric supply. This electric supply can thus be extended horizontally from the house via a similar pole, which should be at least as high as the mast mounted on the mower. Of course, the wire could be permanently connected and stored at the upper story of the house, where a tin covered yoke and drum at the outside could be electrically operated from the inside of the house, to release all the wire and to pull in.

A detachable cover 108 for the plug 99 and cut-out portion 98 of housing part 62 provides a walled enclosure 109 and an attaching flange 110 formed to the shape of the wall of housing part 62 and to fit over the rim 90 of skirt 91. Screws 112 secure the flange 110 to the wall of the housing part. The cover 108 is provided with an opening 113 in the wall 109 through which the conductor 105 extends. The cover 108 is secured in place after the plug 99 is inserted into the socket 100.

To prevent accidental pulling out of plug 99 there is provided a locking clip 114 that is U-shaped and formed of a stiff small diameter rod. The arms 115, 116 of the locking clip extend through openings 117, 118 at the top portion of wall 109, see FIG. 4, with the bight portion 120 located exteriorly and slightly above said top portion of wall 109. The lower ends of arms 117, 118 pass through eyes 122, 123 provided by plate 125 secured to skirt 91, see FIGURES 2 and 4. Plug 99 has a base 99a presenting a flat shoulder 127. The lock clip 114 is manually moved or pulled upwardly out of cover 108 to permit either attachment or detachment of plug 99 to socket 100, see dotted line position. FIGURE 4, with the plug 99 attached and the cover 108 secured to housing part 62, the locking clip 114 is moved down through the cover with the lower ends of arms 115, 116 passing through eyes 122, 123, in which position the arms straddle plug 99 and are in substantial engagement with shoulder 127 of plug base 99a, thus being operative to prevent pulling out of the plug as is readily apparent.

In the assembled relation of stationary housing part 61 and rotating housing part 62 there is provided a slight gap between top edge 67 of housing part 61 and the lower edge 67a of housing part 62 to preclude any danger of the two edges frictionally engaging each other. The skirt 91 overhangs this gap as clearly shown in FIGURE 2 to prevent entry of water, etc. into the housing 60. Cover 108 also functions to protect plug 99 and socket 100 from the elements.

It is to be noted that the bearing mounting of upper rotating housing part 62 is such as to permit 360 degree rotation of the same with relation to the stationary housing part 61 on mast 14.

It is intended that in the fully extended position of the telescoping mast sections 15, 16, 17 that the rotaing part 62 of housing 60 be at least 15 feet high. This in order that the conductor 105 will be free of all obstructions to allow the moving operation around shrubbery and to avoid all entangling of the conductor with the operator and/or the mowing machine while going back and forth. With the top section 17 being thus beyond the reach of the machine operator there is provided manually operated means for telescoping the upper section 17 into the intermediate section 16. This includes a yoke 130 shaped to straddle section 17 having a bight portion 131 and opposed parallel arms 132, 133, see FIGURE 3. The yoke is positioned on section 17 so as to be housed within stationary housing part 61, see FIGURE 2, and the bight portion 131 is rigidly secured to section 17 by welds 135. A detachable shaft 138 is rotatably supported by yoke arms 132, 133, the shaft being threaded at its inner end for a nut 139 held in place by a cotter pin 140. Fixedly secured as by a key (not shown) or by any other means to shaft 138 between yoke arms 132, 133 is a drum 142 on which is wound a small diameter cable 144 providing a winch. Shaft 138 extends through an opening 145 in the wall of housing part 61 and through a bearing bracket 147 secured to the housing part 61 by bolts 148. The outer end portion 150 of shaft 138 extends outwardly of bearing bracket 147 to which is mounted a sprocket wheel 152 having a key connection in key way 153. A nut 154 and cotter pin 155 at the outer terminal end of shaft 138 holds the sprocket wheel 152 in place. Engageable with sprocket wheel 152 is an endless sprocket chain 158. To prevent disengagement of the sprocket chain from the sprocket wheel 152 the same is provided enlarged radial flanges 159. The wall of section 17 opposite the winch drum is slotted, the slot 160 being elongated and relatively wide as shown in FIGURE 2. Cable 144 runs from drum 142 through the slot 160 downwardly through upper section 17 and intermediate section 16 with its lower free end secured in opening 27 of lug 26, see FIGURE 5. The edges of elongated slot 160 are covered by an anti-friction bead 162 of Teflon on other suitable anti-friction material. Thus, when the mast sections are fully extended sections 17 and 16 may be telescoped or collapsed by pulling on sprocket chain 158 to rotate the winch drum 142 in a direction to wind the cable 144 thereon. This will pull sections 17, 16 together. When fully collapsed the same may then be telescoped into lower section 15. In the telescoping of the sections 17, 16, 15 the flexible conductor 52 within the same will fold or wind itself up within the chamber provided by the hollow base 20, see FIGURE 6.

The winch 142, sprocket wheel 152 and chain 158 may be dispensed with to effect a reduction in cost of the mast 14, in which case the sections may be collapsed by hand.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

1. A telescoping mast for controlling a power-supply line from a source of electric supply to a mobile electric motor operated machine comprising:
   (a) a hollow base,
   (b) a plurality of telescoping tubular sections arranged with the largest diameter section lowermost,
   (c) means securing the lowermost section to the base with its axis vertical,
   (d) a two-part housing mounted on the upper end of the uppermost section,
   (e) said two-part housing having a lower housing part fixedly secured to said upper end of said uppermost section and a rotatable upper housing part,
   (f) ball bearing means connecting the upper housing part to the upper end of the uppermost section,
   (g) an electric socket mounted on the rotating upper housing part for connection with a plug at the end of said power-supply line,
   (h) an electric socket mounted on said hollow base for connection with a plug at the end of a conductor to the electric motor of the machine, and
   (i) a flexible conductor within said hollow base and extending through said tubular sections connecting both said electric sockets,
   whereby
   said mast with its tubular sections extended will hold the plug connection of the power-supply line to the socket on the upper rotating housing part at an advantageous height permitting maximum mobility and ground coverage and reducing the opposition to maneuverability of the machine created by shrubbery and other obstructions.

2. The telescoping mast of claim 1, wherein:
   (a) said lower housing part is bowl shaped,
   (b) a cylindrical depending neck at the bottom of said lower housing part encircling said uppermost tubular section below the upper terminal end thereof,
   (c) means rigidly securing said neck to said uppermost tubular section,
   (d) said bowl shaped lower housing part being open at its top and with its edge lying in a horizontal plane below the upper terminal end of said uppermost tubular section,
   (e) said upper housing part being bowl shaped and arranged with the edge of its open end in spaced opposed relation to the edge of said lower housing part,
   (f) a support and closure plate detachably secured to the upper housing part adjacent the edge of its open end,
   (g) a ball-bearing unit having inner and outer races with the outer race fixedly mounted on said support plate,
   (h) the upper end portion of said uppermost tubular section extending through the inner race of said ball-bearing unit, and
   (i) means on said upper end portion fixedly securing the inner race to said uppermost tubular section,
   whereby
   said ball-bearing provides for complete 360 degree rotation of said upper housing part.

3. The telescoping mast of claim 2, including:
   (a) a depending skirt secured exteriorly to the lower end portion of said upper housing part and extending across the upper end portion of the lower housing part and in radial spaced relation thereto.

4. The telescoping mast of claim 3, including:
   (a) a cut-out portion in the wall of said upper housing part,
   (b) said electric socket of said upper housing part being seated on said support plate opposite to said cut-out portion,
   (c) means securing said electric socket to said support plate,
   (d) a hood detachably secured exteriorly of said upper housing part enclosing said cut-out portion and operative as a protective cover for the plug of the power-supply line when connected to said electric socket, and
   (e) a clip means carried by said hood and having a separable connection with said upper housing part for retaining said plug in operative connection with said electric socket and preventing accidental disengagement therefrom.

5. The telescoping mast of claim 4, wherein said means for securing the inner race of the ball bearing to the uppermost tubular section comprises:
   (a) a collar secured to said uppermost tubular section on which is seated the lower face of said inner race,
   (b) a substantially ball shaped member having a depending internally threaded sleeve and an axial bore,
(c) said end portion of said uppermost tubular section extending through the inner race being externally threaded,
(d) said ball member sleeve being threaded on said end portion to clamp said inner race between said collar and sleeve, and
(e) locking means on said sleeve for locking the same to said uppermost tubular section.

6. The telescoping mast of claim 5, wherein:
(a) the upper edge surface of said ball member is rounded, and
(b) the upper end portion of said conductor within the mast passing upwardly through the bore in said ball member and looped over said rounded edge to its connection with the electric socket mounted on the support plate.

7. The telescoping mast of claim 6, wherein:
(a) said hollow base is open at its bottom,
(b) a flange at the bottom edge of said base extending laterally outwardly therefrom,
(c) a closure plate detachably secured to said base adjacent to its open bottom,
(d) an axial upstanding internally threaded cylindrical boss open at its bottom integral with said closure plate, and
(e) a stake member having its upper end portion threaded for threaded engagement with said boss,
whereby
said mast may optionally be either detachably secured directly on the electric motor operated machine for transport therewith or may when detached from the machine and anchored at a fixed point to the ground by attaching the stake member to the closure plate so that by its penetration into the ground the same will effect anchoring of the mast, 8. The telescoping mast of claim 7, including:
(a) an internally threaded cylindrical pocket on said base in which the threaded end of the stake is received when the base is mounted on the electric motor operated machine.

9. The telescopic mast of claim 1, including:
(a) a winch drum having a cable wound thereon,
(b) yoke means secured to the uppermost tubular section within said lower fixed housing part,
(c) a shaft horizontally rotatably supported by the arms of said yoke means and having an end portion extending outwardly of said lower housing part,
(d) said winch drum fixedly mounted on said shaft between the yoke arms,
(e) a bearing bracket secured to said lower housing part through which said shaft end portion extends,
(f) means secured to said shaft end portion extending beyond said bearing for manually rotating the shaft in either direction to wind or unwind the winch drum,
(g) a slot in the uppermost tubular section in opposite relation to said winch drum,
(h) the cable of said winch drum passing through said slot and downwardly through said uppermost tubular section and at least through the next lower tubular section, and
(i) means securing the end of the cable to the lower end of said next lower tubular section,
whereby
with the mast fully extended, rotation of the shaft to wind the cable on the winch drum will pull the uppermost tubular section and the next lower tubular section into complete telescoped relation.

10. The telescopic mast of claim 9, wherein said means secured to said shaft extension for rotating the same comprises:
(a) a sprocket wheel secured to said shaft extension and a sprocket chain operatively engaged with said sprocket wheel, and
(b) a bead of anti-friction material secured to the edge portion of said slot.

References Cited

UNITED STATES PATENTS

| | | |
|---|---|---|
| 1,733,242 | 10/1929 | Semenza et al. |
| 1,802,358 | 4/1931 | Smith. |
| 2,439,010 | 4/1948 | Lange. |

ARTHUR L. LA POINT, Primary Examiner

G. H. LIBMAN, Assistant Examiner

U.S. Cl. X.R.

174—45; 248—404